United States Patent
Avignon et al.

(10) Patent No.: US 6,857,851 B2
(45) Date of Patent: Feb. 22, 2005

(54) AXIAL COMPRESSOR DISK FOR A TURBOMACHINE WITH CENTRIPETAL AIR BLEED

(75) Inventors: Philippe Avignon, Plaisance Du Touch (FR); Antoine Robert Alain Brunet, Moissy-Cramayel (FR); Patrick Claude Pasquis, Moisenay (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/345,211

(22) Filed: Jan. 16, 2003

(65) Prior Publication Data

US 2003/0133788 A1 Jul. 17, 2003

(30) Foreign Application Priority Data

Jan. 17, 2002 (FR) .............................. 02 00523

(51) Int. Cl.$^7$ ................................ F04D 31/00
(52) U.S. Cl. ..................... 415/416; 415/176; 416/96 R; 416/201 R
(58) Field of Search .................. 415/115, 116, 415/176, 177, 178; 416/95, 96 R, 198 A, 201 R

(56) References Cited

U.S. PATENT DOCUMENTS

| | | | |
|---|---|---|---|
| 2,910,268 A | 10/1959 | Davies et al. | |
| 4,415,310 A | 11/1983 | Bouiller et al. | |
| 4,659,289 A | * 4/1987 | Kalogeros | 416/198 A |
| 4,919,590 A | 4/1990 | Stratford et al. | |

FOREIGN PATENT DOCUMENTS

| | | |
|---|---|---|
| DE | 196 17 539 A1 | 11/1997 |
| FR | 2 614 654 | 11/1988 |

* cited by examiner

Primary Examiner—Edward K. Look
Assistant Examiner—Dwayne White
(74) Attorney, Agent, or Firm—Oblon, Spivak, McClelland, Maier & Neustadt, P.C.

(57) ABSTRACT

The invention relates to an axial compressor disk for a turbomachine, the disk including a bleed system for bleeding air centripetally from the compressor stream in order to cool a turbine, said bleed system comprising channels formed outside the working section of the disk and parallel to said section in an extra thickness projecting away from said working section on a face of said disk, wherein the bleed channels are axially open over substantially their entire radial extent.

22 Claims, 2 Drawing Sheets

AXIAL COMPRESSOR DISK FOR A TURBOMACHINE WITH CENTRIPETAL AIR BLEED

The invention relates to an axial compressor disk for a turbomachine, the disk including a bleed system for centripetally bleeding air from the compressor stream in order to cool a turbine, the bleed system comprising channels formed outside the working section of the disk and parallel to said section in an extra thickness that projects outside said working section on a face of said disk, said channels being open to the compressor stream through a connection flange for connecting said disk to an adjacent disk.

BACKGROUND OF THE INVENTION

In order to avoid weakening the strength of the working section of the disk, FR 2 614 654 proposes piercing channels in extra thicknesses that project outside the working section of the disk, these channels passing through the flange connecting with an adjacent disk of the compressor.

The channels are made by electroerosion, which is an operation that is difficult and expensive. In addition, it is difficult to monitor the walls of the channels.

The state of the art is also illustrated by U.S. Pat. No. 4,919,590 and DE 196 17 539. In those two documents, the cooling system has orifices provided in the flange connecting the disk with an adjacent disk, and ribs or blades formed on a face of said disk. Piercing those orifices is likewise laborious.

OBJECT AND SUMMARY OF THE INVENTION

The object of the invention is to propose a compressor disk as mentioned in the introduction in which the machining of the walls and the inspection of the machined walls are made easier, while retaining substantially the same bleed capacities concerning pressure, flow rate, and temperatures.

The invention achieves its object by the fact that the bleed channels are axially open over their entire radial extent, said connection flange presenting alternating notches defining said channels in part, and solid portions for connecting said disk to an adjacent disk.

Advantageously, each bleed channel is defined by two fins that are substantially radial, extending axially from a face of said disk.

Preferably, the bleed channels are disposed on the downstream face of said disk and are fed with bleed air via crescents, or lunules, formed by said notches and the upstream circular bearing surface for connection purposes of the following disk of the compressor.

The invention also provides a turbomachine compressor including a compressor disk as defined above.

Advantageously, the following disk includes, in its radially inner region, an annular sealing sleeve that extends axially towards said fins.

BRIEF DESCRIPTION OF THE DRAWINGS

Other advantages and characteristics of the invention appear on reading the following description given by way of example and with reference to the accompanying drawings, in which.

MORE DETAILED DESCRIPTION

Figure 1:
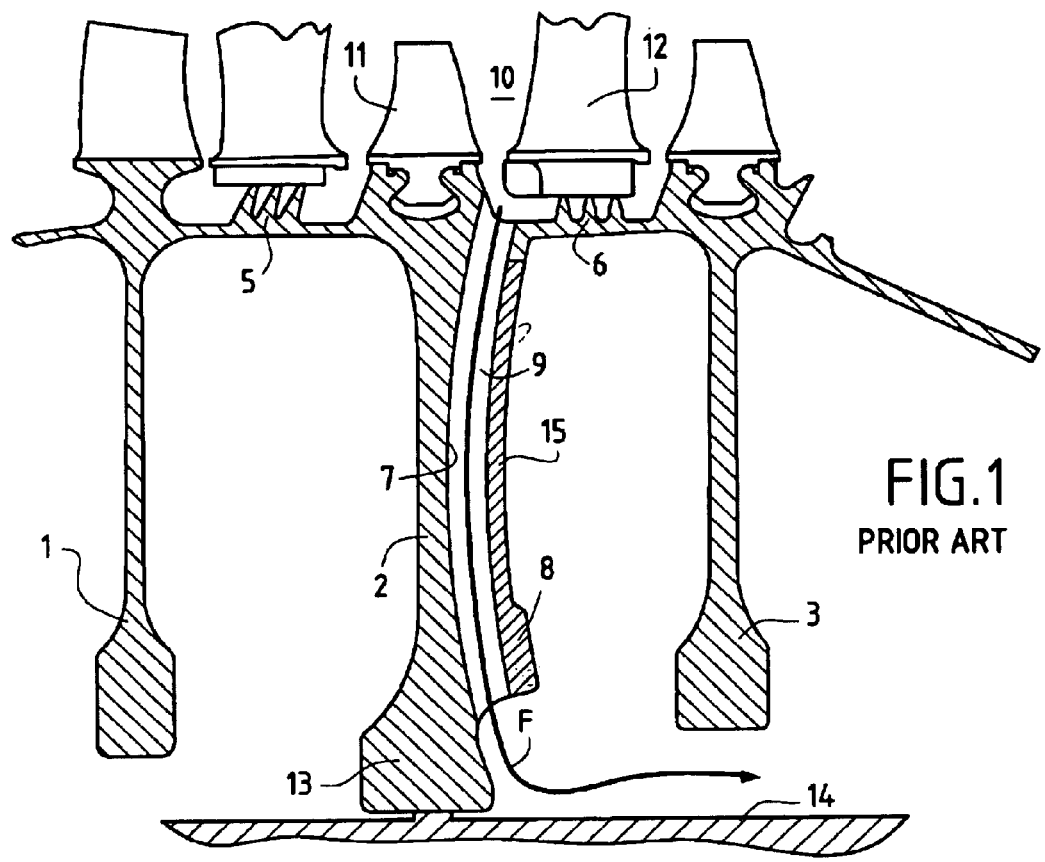
FIG. 1 is an axial half-section of a prior art compressor drum, the half-section containing the axis of a bleed channel.

FIG. 1 shows the disks 1, 2, and 3 of three consecutive stages of a prior art turbomachine compressor. The disks 1 to 3 are interconnected by downstream flanges 5 and 6 welded to circular bearing surfaces of the upstream disk.

On its downstream face 7, the disk 2 has extra radial thicknesses 8 separated by recesses and disposed outside the working section of the disk 2. The term "working section" is used to mean the section of the disk designed in terms of materials strength to withstand the forces that apply in rotation under operating conditions of the turbomachine.

Bleed channels 9 are formed in the extra thicknesses 8. These bleed channels 9 open out through the flange 6 into the stream 10 of the hot flow between the blades 11 of the disk 2 and the vanes 12 of the stator. The air flow F bled off via a bleed channel 9 flows towards the radially inner solid portion 13 of the disk 2 and is then channeled axially by the turbine shaft 14 towards the turbines for cooling.

The bleed channels 9 are in the form of tubes made by electroerosion, and reference 15 in FIG. 1 designates the wall portion of each tube that is spaced apart from the downstream face 7 of the disk 2.

Figure 2:
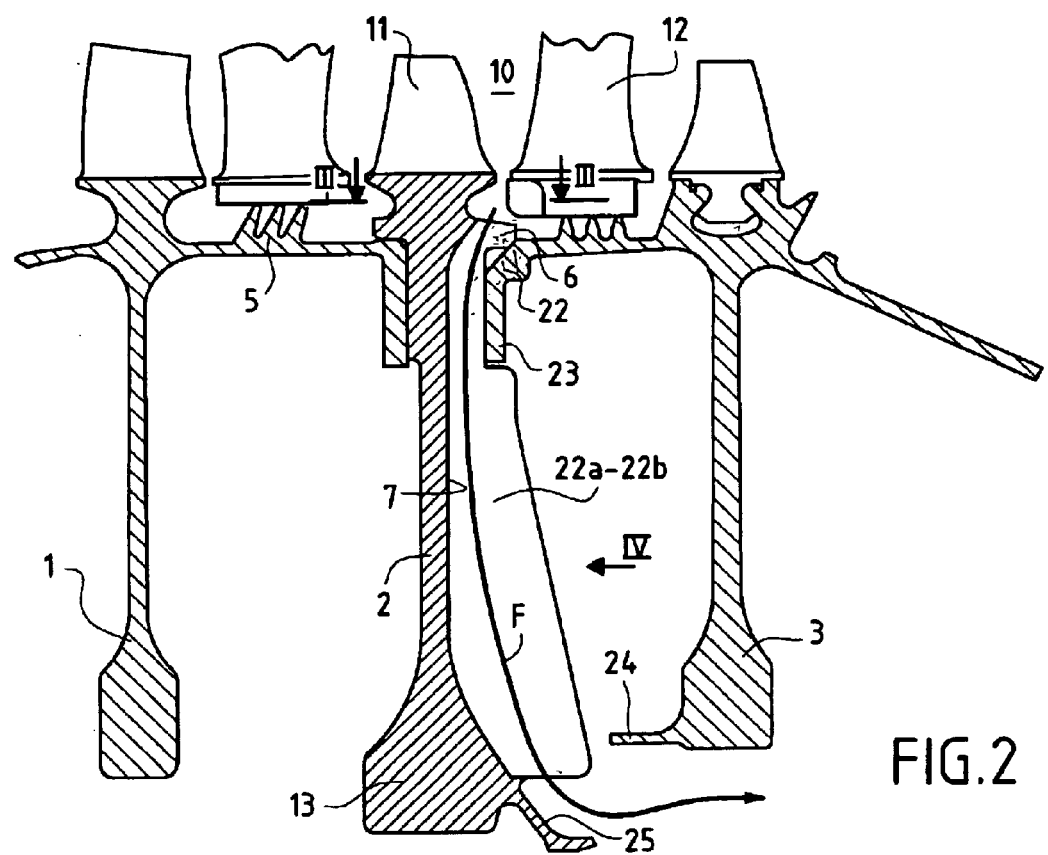
FIG. 2 is an axial half-section of a compressor drum of the invention, the half-section containing the axis of a bleed channel.
Figure 3:
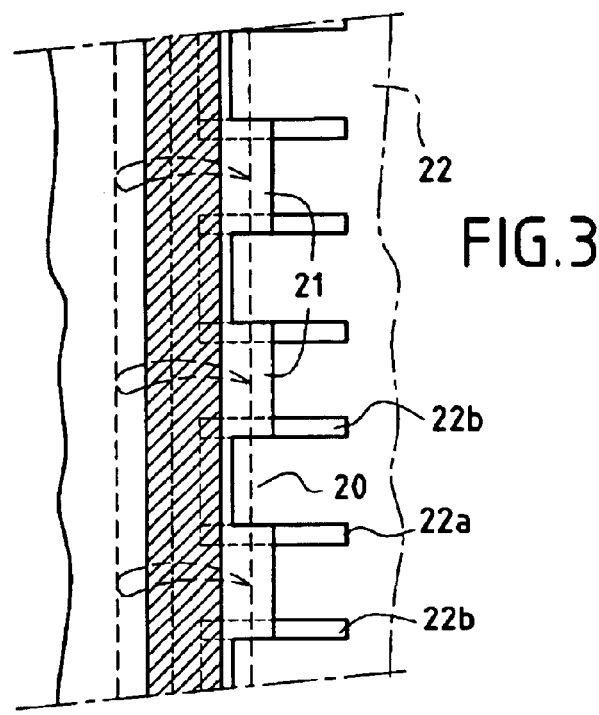
FIG. 3 is a view of the periphery of the disk on line III—III of FIG. 2.
Figure 4:
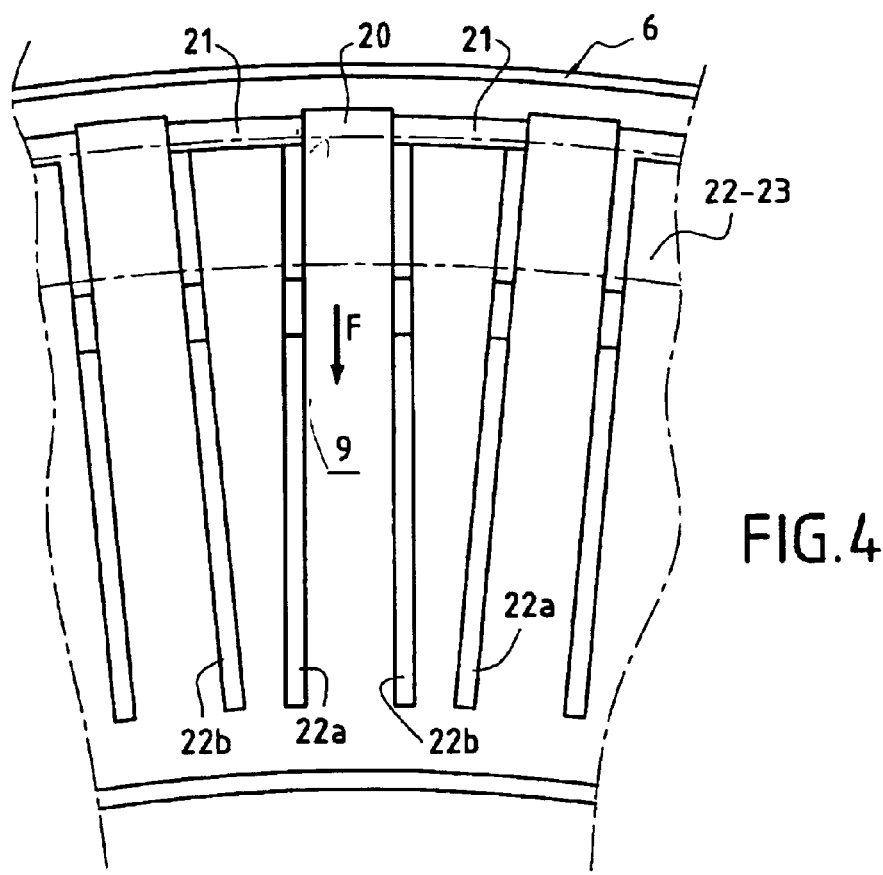
FIG. 4 is a front view of the disk.

FIGS. 2 to 4 show the same disks 1, 2, and 3, but of a turbine compressor of the invention, which disks are interconnected by downstream flanges 5, 6 welded to circular bearing surfaces on the downstream disk.

The downstream flange 6 of the disk 2 presents alternating notches 20 and solid portions 21. When the flange 6 is welded to the upstream circular bearing surface 22 of the disk 3, the notches form crescents, or lunules, which enable air to be taken from the stream 10 of the hot flow between the blades 11 of the disk 2 and the vanes 12 of the stator. The bled-off air flows F are guided radially along the downstream face 7 of the disk 2 by pairs of radial fins 22a and 22b which extend axially towards the following disk 3 from the downstream face 7.

These fins 22a and 22b extend axially from the radially inner solid portion 13 of the disk 2 to the solid portions 21 of the flange 6 on either side of a notch 20.

These bleed channels 9 are thus axially open, facing towards the following disk 3 along their entire radial extent. The upstream circular bearing surface 22 of the disk 3 includes in particular a lip 23 directed towards the axis of rotation of the turbomachine and welded to radially outer portions of the fins 22a and 22b. As can be seen clearly in FIG. 2, the axial extent of the fins 22a and 22b increases on coming closer to the solid portion 13 of the disk 2. The following disk 3 includes, in its radially inner region, an annular sleeve 24 extending axially towards the axial ends of the fins 22a, 22b, thus providing sealing in this zone. At the outlet from the bleed channels 9, the air flow F is deflected axially by a conical extension 25 of the solid portion 13.

What is claimed is:

1. An axial compressor disk for a turbomachine, the disk including a bleed system for centripetally bleeding air from a compressor stream in order to cool a turbine, the bleed system comprising channels formed outside a working section of the disk and parallel to said working section in an extra thickness that projects outside said working section on a face of said disk, said channels being open to the compressor stream through a connection flange for connecting said disk to an adjacent disk, wherein the bleed channels are axially open over their entire radial extent, said connection flange presenting alternating notches defining said channels in part, and solid portions for connecting said disk to said adjacent disk.

2. A disk according to claim 1, wherein each bleed channel is defined by two fins that are substantially radial, extending axially from a face of said disk.

3. A disk according to claim 2, wherein the bleed channels are disposed on a downstream face of said disk and are fed with bleed air via lunules formed by said notches and an upstream circular bearing surface of said adjacent disk.

4. A turbomachine compressor, including a disk according to claim 3.

5. A compressor according to claim 4, wherein the adjacent disk includes, in its radially inner region, an annular sealing sleeve that extends axially towards said fins.

6. A compressor according to claim 4, wherein the axial extent of the fins increases on approaching the radially inner solid portion of the disk.

7. A compressor according to claim 6, wherein the solid portion of the disk includes a conical extension for deflecting the air flow axially.

8. An axial compressor disk for a turbomachine, the axial compressor disk including a bleed system for centripetally bleeding air from a compressor stream in order to cool a turbine, the bleed system comprising channels formed outside a working section of the axial compressor disk and parallel to said working section in an extra thickness that projects outside said working section on a face of said axial compressor disk, said channels being open to the compressor stream through a connection flange for connecting said axial compressor disk to an adjacent disk,
wherein the bleed channels are axially open over their entire radial extent, said connection flange presenting alternating notches defining said channels in part, and solid portions for connecting said axial compressor disk to said adjacent disk, and
wherein the bleed channels are disposed on a downstream face of said axial compressor disk and are fed with bleed air via lunules formed by said notches and an upstream circular bearing surface of said adjacent disk.

9. A compressor for a turbine, the compressor comprising:
a plurality of disks interconnected by a plurality of flanges, said plurality of disks comprising a first disk and a second disk, said plurality of flanges comprising a flange between said first disk and said second disk, wherein said first disk comprises channels configured to guide an air flow along said first disk, said second disk comprises an upstream bearing surface, and said flange comprises alternating notches and solid portions, said notches and said upstream bearing surface defining openings configured to feed air into said channels.

10. The compressor of claim 9, wherein said channels are axially open toward said second disk.

11. The compressor of claim 10, wherein said channels are axially open over their entire radial length.

12. The compressor of claim 9, wherein said openings are crescent-shaped.

13. The compressor of claim 9, wherein said channels are formed outside a working section of said first disk.

14. The compressor of claim 13, wherein said channels are parallel to said working section in a portion that projects from said working section on a face of said first disk.

15. The compressor of claim 9, wherein each of said channels is defined by two fins.

16. The compressor of claim 15, wherein said fins are substantially radial, extending axially from a face of said first disk.

17. The compressor of claim 9, wherein said channels are disposed on a downstream face of said first disk.

18. The compressor of claim 9, wherein said second disk comprises an annular sleeve extending axially towards said first disk.

19. The compressor of claim 15, wherein said first disk comprises a radially inner solid portion and an axial extent of said fins is greater toward said radially inner solid portion than toward said flange.

20. The compressor of claim 9, wherein said first disk comprises a radially inner solid portion with a conical extension configured to deflect air flow axially.

21. The compressor of claim 9, wherein said plurality of disks forms a complete hub for said compressor, and said plurality of disks includes only one disk having the configuration of said first disk.

22. The compressor of claim 9, wherein said first disk is free of orifices formed by piercing said first disk.

* * * * *